Sept. 8, 1953    S. S. BARROWS    2,651,235
MAGNIFYING INSTRUMENT FOR PRECISION MEASURING DEVICES
Filed Sept. 13, 1949    2 Sheets-Sheet 2
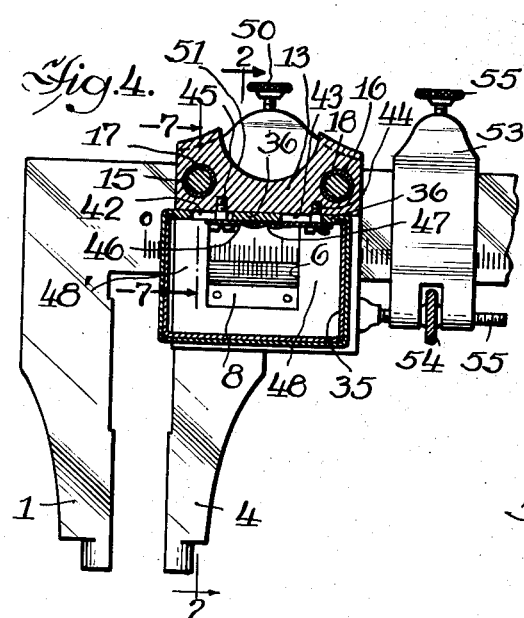
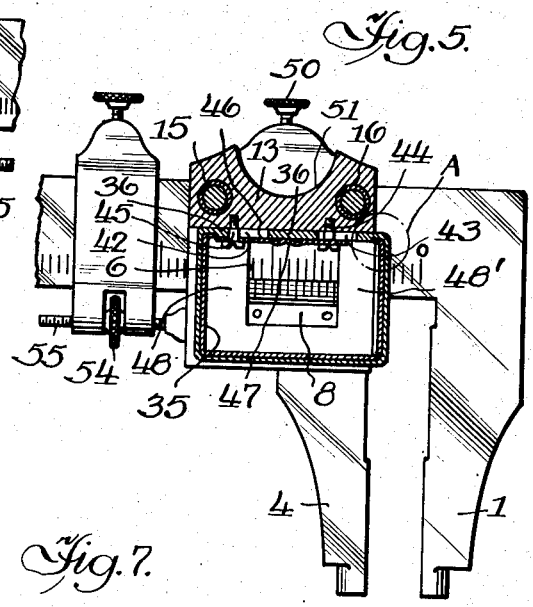
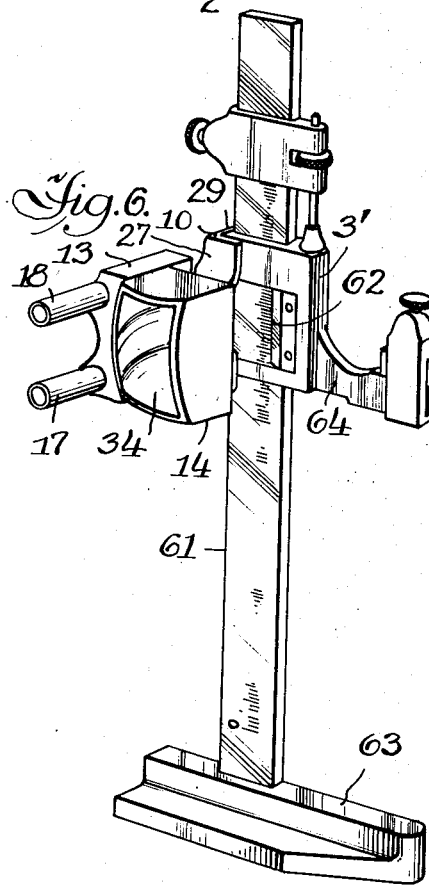
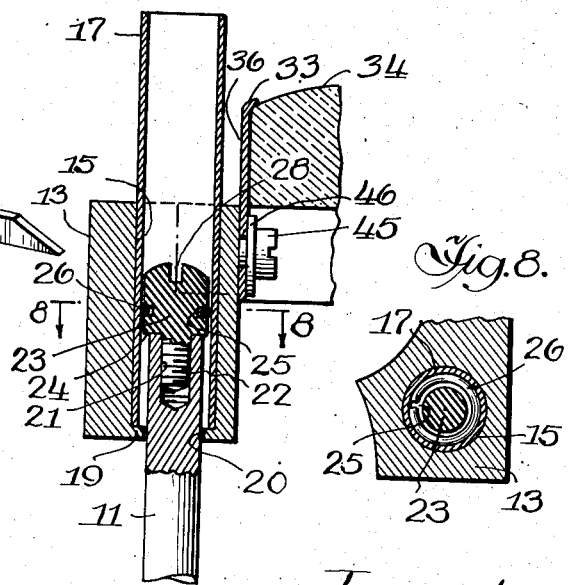
Inventor
Stephen S. Barrows
By Frederick F. Mason
Atty.

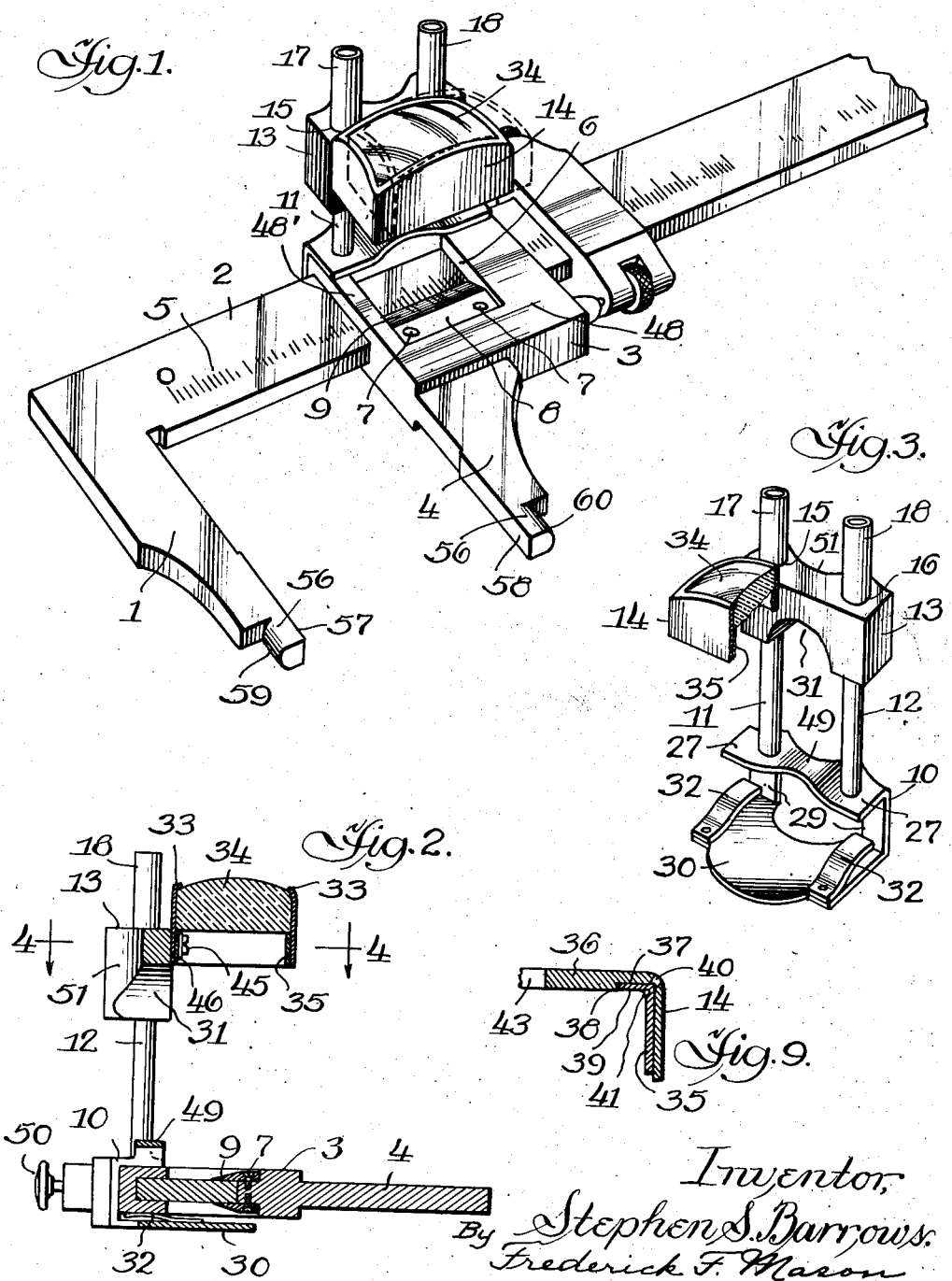

Patented Sept. 8, 1953

2,651,235

UNITED STATES PATENT OFFICE 2,651,235

MAGNIFYING INSTRUMENT FOR PRECISION MEASURING DEVICES

Stephen S. Barrows, Minneapolis, Minn.

Application September 13, 1949, Serial No. 115,320

10 Claims. (Cl. 88—39)

This invention relates to a magnifying instrument for precision measuring devices, and more particularly for such devices as vernier calipers, height gages and the like, said magnifying instrument being of novel construction and permitting quick, easy and accurate reading of measurements taken on such devices having exceedingly fine lines, which readings are very difficult to read with the naked eye.

In vernier calipers, height gages, machinist's scales, and the like, the lines are so fine that without the aid of some magnifying lens it is practically impossible to read the measurements being taken, and even if an operator might have especially strong eyes, the reading of such fine lines would result in dangerous eye strain, as well as involving the hazard of an erroneous reading with the possibility of having to scrap a costly job because of such error. In the present invention I have overcome the above disadvantages by providing a magnifying instrument that is quickly and readily adjustable to the proper focus, includes means for positively holding sliding focus-adjusting parts against slipping, and enables lateral shifting of the lens to be properly positioned directly over the reading zone of the scale when the magnifying instrument is shifted from one side to the other of a measuring device having a scale on both sides.

While I have shown and described the present invention as being particularly adapted for use with vernier calipers, height gages and the like, it is to be understood that it may be used on any other type of precision measuring device to which it may be suitably adapted.

Among the objects of my invention are: to provide a new and improved magnifying instrument for precision measuring devices having fine scale lines; to provide a magnifying instrument having novel means for permitting easy sliding movement of the lens toward and away from the indicia to be read, and which, when the adjusting force has been removed, will positively hold the movable parts against slipping; to provide means for permitting edgewise movement of the lens with relation to the focusing head when the magnifying instrument is transferred from one side to the other of a precision measuring device having a scale on both sides; to provide improved means for mounting the lens in its supporting frame; to provide generally improved construction for a magnifying instrument; and such further objects, advantages and capabilities as inherently possessed by my invention, as will later more fully appear.

My invention further resides in the combination, construction and arrangement of parts illustrated in the accompanying drawings, and while I have shown therein a preferred embodiment, I wish it understood that the same is susceptible of modification and change without departing from the spirit of my invention.

In the drawings:

Fig. 1 is a fragmentary perspective view of a vernier caliper having applied thereto a magnifying instrument embodying my invention.

Fig. 2 is a transverse section on the line 2—2 of Fig. 4.

Fig. 3 is a perspective view, partly in section, of the magnifying instrument of the present invention, and showing it detached from the precision measuring device.

Fig. 4 is a fragmentary longitudinal section on the line 4—4 of Fig. 2, showing the lens holder as slid to the left with relation to the focusing head so that the lens may be placed squarely over the measurement reading hole in the sliding jaw of a vernier caliper.

Fig. 5 is a view similar to Fig. 4 but showing the vernier caliper as turned over end for end and the lens holder slid in the opposite direction with relation to the focusing head so as to again bring the lens squarely over the measurement reading hole in the sliding jaw of a vernier caliper having a measuring scale on both sides.

Fig. 6 is a perspective view of a height gage having my magnifying instrument applied thereto.

Fig. 7 is an enlarged fragmentary vertical section on the line 7—7 of Fig. 4.

Fig. 8 is a fragmentary horizontal section on the line 8—8 of Fig. 7.

Fig. 9 is an enlarged horizontal section of the corner of the lens holder shown within the circle A of Fig. 5.

In Figs. 1, 4 and 5 of the drawings I have shown my improved magnifying instrument as applied to a vernier caliper, and in Fig. 6 it is shown as applied to a height gage. The vernier caliper shown is of conventional form having a stationary jaw 1 fixed to a scale bar 2 upon which is slidably mounted a movable head 3 having fixed thereto a jaw 4 which will hereinafter be referred to as the movable jaw. Formed along the upper face of the scale bar 2, as viewed in Fig. 1, are the usual scale graduations 5, indicating inches and fractions thereof. The movable head 3 has formed through each of its side faces a rectangular opening 6 through which the underlying scale graduations are visible, it being understood that, in the form of vernier caliper shown in Figs. 1, 4 and 5, there is a scale on one side of the scale bar 2 for reading outside measurements, and a scale on the other side for reading inside measurements. Fixed by screws 7, or the like, to the movable head 3 is a vernier plate 8 having on its free beveled edge portion vernier graduations 9, which co-operate with the adjacent scale graduations 5 to enable a vernier reading in the usual manner. As is well known, the graduations on the scale bar and on the vernier plate are fine and close together, and when reading the vernier it is necessary to be able to precisely and positively know without error when two of the lines exactly coincide. Applicant has provided for magnifying these fine lines and the numerals associated therewith, by a novel magnifying attachment which will now be described.

Referring to Figs. 1–3, my magnifying attachment comprises generally a base member attaching element 10, a pair of upstanding posts 11 and 12, and a focusing head 13 upon which is edgewise slidably mounted a lens supporting frame or holder 14. Focusing head 13, as seen in Figs. 1 and 3–5, is formed with a pair of laterally spaced apart vertical holes 15, 16, within which are fixed to extend upwardly therefrom a pair of tubes 17 and 18, respectively. As will be noted in Fig. 7, each of holes 15 and 16 are of larger inside diameter than the outside diameter of each of posts 11 and 12, the focusing head 13 at the bottom end of each of holes 15 and 16, being formed with an annular shoulder 19 surrounding a hole 20 of smaller diameter than the inner diameter of either of tubes 17 and 18 and concentric therewith. As the construction of the interior sliding parts in the two tubes 17 and 18, by which the focusing head is slidably mounted on posts 11 and 12, are identical, only one description of them will be made, and which will be understood by reference to Fig. 7.

The diameter of hole 20 is just enough larger than the diameter of post 11 to enable a free sliding movement of the focusing head longitudinally of the posts. Post 11 is formed in its upper end with a threaded hole 21 within which is threaded a stem 22 integrally formed to extend downwardly from removable post head 23 which is concentric with tube 17 and enough smaller than said tube to permit free sliding movement thereover of this tube. As will be seen in Fig. 7 the outside diameter of post head 23 is larger than hole 20 so that shoulder 19 of the focusing head will strike the shoulder 24 of the post head 23 when the focusing head is moved upwardly to its extreme limit. Shoulder 24 is formed by reason of the post head 23 being somewhat larger in diameter than post 11.

Post head 23 is formed around its outer face with a circumferential groove 25, within which is positioned an expansion ring 26, the outside diameter of which, when free of external forces, is somewhat larger than the internal diameter of tube 17, so that when ring 26 is forced into tube 17 it will contract inwardly and due to the resiliency of the expansion ring it will bear outwardly against the inner surface of the tube. This sliding friction between the rings 26 and tubes 17 and 18 will permit sliding movement of the focusing head with relation to posts 11 and 12, and when the sliding force is removed from the focusing head it will positively stand in its adjusted position against slipping. The focusing head may be removed from the posts by pushing it downwardly until its lower side contacts the top flange 27 of the attaching element 10, so as to expose the screw driver slots 28 of the post heads 23 at the top of the tubes, then unscrewing post heads 23 from the posts, and removing the focusing head with its associated parts from the posts. It can be returned into position over the posts by the reverse operations, it being understood that at the same time the expansion rings 26 will be pushed inwardly a sufficient amount to force them into their respective tubes.

As seen in Fig. 7 the bottom end of each of the tubes 17 and 18 contacts shoulder 19 of the focusing head, each of the tubes being fixedly held in its respective hole in the focusing head by a press fit, a squeeze fit, or any other suitable means. From this construction it will be seen that the focusing head is easily slidable manually along posts 11 and 12, between the limits defined by the bottom of the focusing head striking the top flange 27 of the attaching element 10 for the bottom limit, and the shoulder 24 of the post head 23 striking the shoulder 19 of the focusing head 13 for the top limit. The expansion rings 26 bearing frictionally against the interior of the tubes prevent any slipping of the focusing head with relation to the posts when the sliding force is removed, and thus guarantee that the particular focus will be maintained without the need of set screws or other holding means.

The base or attaching element 10 is formed with a pair of spaced web members 29, a bottom flange plate 30, and said top flange 27 preferably bowed upwardly at its central portion directly below the upwardly curved recess 31 in the focusing head, so as to freely clear the head of the locking screw on the movable head 3. The bottom ends of the posts 11 and 12 are firmly fixed to the top flange 27 of the base or attaching element 10, adjacent its ends in any suitable manner, to form a unitary structure therewith. Secured to the upper face of bottom plate 30 at the ends thereof are a pair of upwardly bowed spring members 32 each fixed at one end to said bottom plate with its free bowed end extending toward the adjacent web member 29. These spring members are such that the base or attaching member 10 may be pushed laterally over the back edge of the movable head 3 and be firmly held thereon by flexing of the spring members 32, but at the same time enable the base member and attached parts to be removed from the movable head by pulling it edgewise therefrom.

The lens frame or holder 14 comprises a rectangular casing having four side walls integrally connected together and having an open bottom, said side walls being formed at their upper edges with inwardly extending flanges 33 to hold the lens 34 in its uppermost position therein. In order to firmly hold the lens against flanges 33 there is provided a three sided strip 35 of hard aluminum dipped into a caustic dip to take off the glare but retain a lighting nonglare effect to facilitate easy reading of the scale graduations. The rear side wall 36, as seen in Figs. 4, 5 and 9, is formed at each end with a recess 37 forming a dove-tailed shoulder 38 (see Figure 9), against which the free end of the flange 39 at the respective ends of the three sided strip 35 abuts. To hold the lens edge of the three sided strip against the inner face of the lens and prevent slipping thereof, the four side walls forming the main portion of the lens holder where they join each other at each of the corners of the lens holder are formed with a small hole 40 into which the metal of the three sided strip 35 is forced by a prick-punch indentation 41. The shoulders 38 hold the three sided strip 35 in outwardly spread position against the inner faces of the side walls of the lens holder, and the prick-punch protuberances in holes 40 hold strip 35 against slipping edgewise out of the holder. This provides an easily assembled and light yet sturdy lens holder.

As seen in Figs. 4 and 5, the rear side wall 36 of the lens holder is formed with a pair of spaced apart slots 42 and 43 slidable over a pair of shouldered headed pins 44 and 45 threaded into the focusing head 13. Positioned between the heads of said pins and the inner side face of wall 36 is a spring 46 having an intermediate bowed portion 47 to frictionally bear against the inner face of wall 36 of the lens holder. From this it is seen that when the magnifying instrument is moved from one side of the movable head 3 to the other by slipping it off from said one side against the friction of bowed springs 32, turning it over end for end and side for side and pushing it again into place on the other side of the movable head, the lens holder may be frictionally slid edgewise to bring the lens directly over that portion of the scale to be read easily with relation to the vernier scale 9. This is desirable because, when during said turning over of the magnifying instrument it is also turned side for side, which would throw the lens out of its proper positioning with relation to the rectangular opening 6 on said other side. This is because the conventional vernier caliper is so built that the side bar 48 of the movable head 3 (see Fig. 1) is wider than the opposite side bar 48'. Consequently, when the lens holder is in proper position squarely over the rectangular opening 6 on one side of the caliper movable head 3, its left hand end as viewed in Fig. 4 is slightly to the left beyond the left hand edge of the narrow bar 48', while its right hand edge is to the left of the right hand edge of the wider bar 48. However, when the magnifying instrument is applied to the opposite side of the movable head 3, which, as stated, necessitates turning the magnifying instrument around from side to side, the middle of the reading area of the lens is no longer directly over the central portion of its respective opening 6 on that side but has been moved in a direction too far over the wider bar 48. This can be instantly overcome by sliding the lens holder edgewise, as described above, to again bring the central portion of the lens directly over the central portion of the scale graduations and vernier scale within the opining 6, to make the reading of the measurement exact, as will be understood in Fig. 5 in which said shift has been made.

The upwardly bowed portion 49 of the base top flange 27 permits the base member 10 to straddle the set screw head 50, with the bowed portion freely clearing the same. The focusing head 13 on its rear vertical face is formed with a deep recess 51 which, together with the bottom recess 31 (see Fig. 3), affords the entry of more light to the portion of the scale underneath the lens during a reading.

As is common in conventional vernier calipers, the set screw 50 locks the movable head 3 in final adjusted position, and when set screw 50 is loosened, fine adjustments may be made over the work by tightening set screw 52 of the auxiliary movable head 53, and manipulating wheel 54 threaded onto the threaded stem 55 fixed to movable head 3. Also, as well understood in vernier calipers, each of the stationary jaws 1 and the movable jaw 4 is formed at its free end with offsets 56 whereby outside diameter measurements may be taken between the inside faces 57 and 58 of these jaws, and inside dimensions may be measured between the outside faces 59 and 60. The scales for the outside and inside measurements are on opposite sides of the scale bar.

In the form shown in Fig. 6 the invention is illustrated as applied to a height gage of conventional form. The graduations on one face of the scale bar 61 of the height gage and the graduations on the vernier plate 62 are similar to those described above in connection with the vernier caliper. This height gage has a base member 63 and an adjustable arm 64 for measuring the height of the work as desired. In this form the structure of the magnifying instrument is the same as that described above in connection with the other figures of the drawing, and hence need not be repeated in detail, corresponding parts being indicated by the same reference numerals. The base member of the magnifying instrument will be slipped over the edge of the movable head 3' of the height gage in the same manner as when it is slipped over the movable head of the vernier caliper. When the desired height has been ascertained, the measurement may be quickly and easily read through the lens of the magnifying instrument.

Fig. 5 illustrates the reverse side of the vernier caliper of Fig. 1, it being understood, as pointed out above that one side of the caliper will be for reading outside measurements, and the other side will be for reading inside measurements. Fig. 1 shows the vernier caliper in position for reading outside dimensions, while Fig. 5 shows it in position for reading inside dimensions.

The focusing is made with the piston-type friction ring 26 which enables the user to quickly find the correct position to meet his vision requirements. No two pairs of eyes are alike, and the focusing unit of the present invention aptly meets the user's needs. The focusing is accomplished quickly and easily without any adjusting screws or the like, as all that is necessary is for the operator to push up or down on the focusing head with an easy movement of his fingers, and the focusing head remains in the focused position to which it was pushed without any danger of thereafter inadvertently slipping on the posts.

While mention has been made of slipping the magnifying instrument off from one edge of the vernier caliper and turning it over end for end and side for side and again slipping it over said edge, which presupposes then turning the caliper over so that the reading can be read from the top side, the same result would be accomplished by slipping the magnifying instrument off from the caliper, turning the caliper over end for end and then slipping the magnifying instrument in its same position back over the same edge. As will be understood, this turning over of the vernier caliper end for end with the magnifying instrument off and standing in the same position, changes the position of the wider side bar 48 from one side to the other relatively to the magnifying instrument. As standard well-known vernier calipers are made, this change of position of the magnifying instrument from one side of the caliper to the other, due to the change of position of the wider side bar 48 relative to the magnifying instrument, would throw the center of the lens too far over the wider side bar and make it more difficult to read the measurement being taken, were it not for the present invention. In the present invention this difficulty is overcome by making the lens and lens supporting frame movable edgewise in a direction longitudinally of the scale bar, relatively to the focusing head. This enables the operator to slide the lens one way or the other so as to always position the lens squarely over the side opening in the slidable head of the capiler, regardless of which side of the caliper is up. This is of the greatest value in a shop where the need for accurate reading of the fine lines on the vernier scale is always supreme.

Having described my invention, I claim:

1. A magnifying instrument for precision tools, comprising, a base member having resilient gripping means to be removably slid edgewise over a precision tool, an upstanding post fixed to said base member, a focusing head having an opening within which said post is positioned, said focusing head being slidable longitudinally along the post, a one-piece post head removably fixed to the upper end of the post and having an extended cylindrical side wall of a diameter slightly less than the diameter of the opening in the focusing head, said side wall having a circumferential groove of constant size, and an expansible resilient metal ring mounted in said groove and normally urged radially outwardly to frictionally bear against substantially all circumferential sides of the wall of said opening in the focusing head during longitudinal movement of the focusing head on the post while the focusing head and post are held against rotation with relation to each other.

2. A magnifying instrument as claimed in claim 1, in which said post head is of larger diameter than the main body portion of the post and extends a substantial distance beyond the end of the post, and the focusing head has a shoulder adjacent the bottom of the opening therein to prevent the focusing head from being pulled off the post.

3. A magnifying instrument for precision measuring tools, comprising, a base member having a top flange and a bottom flange plate and an upwardly bowed spring arm fixed at one end to said bottom plate and at its other end spaced away from said bottom plate and free therefrom to form resilient gripping means to be removably slid laterally edgewise over a precision tool, a pair of spaced apart parallel upstanding posts fixed to said top flange, a focusing head having a pair of holes respectively in axial alinement with said posts, a tube fixed in each of said holes to extend upwardly from the focusing head, a cylindrical post head removably fixed to the upper end of each of said posts and of greater diameter than its respective post, said post heads being slidably mounted one in each of said tubes, and friction means between each of said post heads and its respective tube to enable the focusing head to be slidably moved on said posts and be positively held against inadvertent slipping when the sliding force is removed from the focusing head, said friction means encircling its respective post head and at all times exerting a constant force against all sides of the tube without adjustment while the post head is in the tube, the focusing head and each of said posts being at all times held against rotation with relation to each other.

4. A magnifying instrument as claimed in claim 3, in which the focusing head is formed adjacent the lower end of each of its said holes with an inwardly extending annular shoulder against which the bottom end of said tubes respectively contact, each of said shoulders extending radially inwardly beyond its respective tube and defining an opening of smaller diameter than that of its respective post head and tube and slightly larger than that of its respective post to prevent the focusing head from being pulled off from the posts, the upper end of each of said tubes being open so that when the focusing head is moved to its downward limit the post heads will be available for removal from the posts.

5. A magnifying instrument for precision measuring tools having a graduated measuring scale on each of its side faces and a movable head having on both sides a sight opening non-symmetrically arranged with relation to the movable head for viewing either one of said scales, comprising a base member having resilient gripping means to be removably slid laterally edgewise over a precision tool, a pair of spaced apart parallel, upstanding posts fixed to said base member, a focusing head having a pair of holes respectively in axial alinement with said posts, said holes being slidable on said posts, a post head removably fixed to the upper end of each of said posts, each of said post heads being formed with a circumferential groove of constant size, a resilient metal expansion ring in each of said grooves normally urged radially outwardly to frictionally contact all sides of the respective hole in the focusing head so that the focusing head will be held against slipping from any position to which it may be slid on the posts, a lens holder slidably mounted on the focusing head for movement with relation thereto only in the directions longitudinally of the precision tool to which it is attached, a lens in said lens holder, and friction means slidably clamped between the lens holder and the focusing head to constantly hold the lens holder in contact with the side of the focusing head, whereby when the magnifying instrument is moved from one side face to the other of the precision tool, the lens holder may be slid with relation to the focusing head to bring the central portion of the lens directly over the graduations visible through the sight opening and to be read for the measurement taken.

6. A magnifying instrument for a precision tool having a fine graduated measuring scale thereon and a movable head with vernier graduations, comprising, a base member having resilient gripping means to be removably slid laterally edgewise over said movable head, a pair of spaced apart, parallel, upstanding posts fixed to said base member, a focusing head having a pair of holes respectively in axial alinement with said posts and axially slidable thereon, a post head removably fixed to the upper end of each of said posts, each of said post heads having a circumferential groove and a resilient metal expansion ring therein, said expansion rings being normally urged outwardly and bearing with a constant uniform force against all side walls of said holes at all times while the post heads are in the holes, each of said post heads being of a larger diameter than the main body portion of its post and extending a substantial distance beyond the end of the post, the focusing head and posts being at all times held against rotation with relation to each other.

7. A magnifying instrument as claimed in claim 6, in which the inner end of the wall of each of said holes is formed with a shoulder having an opening concentric with the respective hole for the post to slide therethrough but prevent the post head from being pulled thereout of, and a tube in each of said holes having one end adjacent said shoulder and its other end extending outwardly beyond said focusing head, the outer ends of the tubes being open and said post heads being accessible through the outer end of the tubes for removal from their respective posts when the focusing head is slid to its innermost position.

8. A magnifying instrument for precision measuring tools, comprising, a base member having resilient gripping means to be removably slid laterally edgewise over the precision tool, a pair of parallel spaced posts fixed to said base, a focusing head having a pair of holes respectively in axial alinement with said posts, a post head removably fixed to the upper end of each of said posts, each of said post heads having a circumferential groove, a resilient metal expansion ring in each of said grooves, said post heads being slidable in said holes respectively, each of said rings bearing against all side walls of its respective hole with a constant unchanging pressure, and said magnifying instrument being selectively attachable to either side of the precision tool, the focusing head and posts being at all times held against rotation with relation to each other.

9. A magnifying instrument for precision measuring tools, comprising, a base member having resilient gripping means to be removably slid laterally edgewise over a precision tool, a pair of spaced apart parallel upstanding posts fixed to said base member, a focusing head having a pair of holes respectively in axial alinement with said posts, a tube fixed in each of said holes to extend upwardly from the focusing head, a cylindrical post head removably fixed to the upper end of each of said posts and of greater diameter than its respective post, said post heads being slidably mounted one in each of said tubes, and friction means between each of said post heads and its respective tube to enable the focusing head to be slidably moved on said posts and be positively held against inadvertent slipping when the sliding force is removed from the focusing head, said friction means encircling its respective post head and at all times exerting a constant force against the tube without adjustment while the post head is in the tube, in said friction means each of said cylindrical post heads being formed with a circumferential groove of constant size, and an expansible resilient metal ring in each of said grooves, each of said rings being urged radially outwardly with a constant force against its respective tube without any adjustment while in the tube, the focusing head and said posts being held against rotation with relation to each other.

10. A magnifying instrument for a precision tool having a fine graduated measuring scale thereon and a movable head with vernier graduations, comprising, a base member having resilient gripping means to be removably slid laterally edgewise over said movable head, a pair of spaced apart, parallel, upstanding posts fixed to said base member, a focusing head having a pair of holes respectively in axial alinement with said posts and axially slidable thereon, a post head removably fixed to the upper end of each of said posts, each of said post heads having a circumferential groove and a resilient metal expansion ring therein, said expansion rings being normally urged outwardly and bearing with a constant uniform force against all side walls of said holes at all times while the post heads are in the holes, each of said post heads being of a larger diameter than the main body portion of its post and extending a substantial distance beyond the end of the post, the focusing head and posts being at all times held against rotation with relation to each other, a lens on said focusing head, the inside underneath face of the focusing head between said posts having an upwardly extending recess of substantial size, and the outside lateral face of the focusing head between said posts having an inwardly extending recess of substantial size, whereby said recesses provide for the admission of light to that portion of the scale underneath the lens for easy reading of the graduations on the scale.

STEPHEN S. BARROWS.

References Cited in the file of this patent

UNITED STATES PATENTS

| Number | Name | Date |
|---|---|---|
| 2,127,711 | Baldauf | Aug. 23, 1938 |
| 2,355,161 | Holstein | Aug. 8, 1944 |
| 2,367,872 | Kamienski | Jan. 23, 1945 |
| 2,490,648 | Ohl | Dec. 6, 1949 |
| 2,503,997 | Bu Miller | Apr. 11, 1950 |
| 2,542,967 | Waechter | Feb. 20, 1951 |

FOREIGN PATENTS

| Number | Country | Date |
|---|---|---|
| 530,320 | Germany | July 27, 1931 |